(12) United States Patent
Spierer et al.

(10) Patent No.: US 12,079,566 B2
(45) Date of Patent: Sep. 3, 2024

(54) SYSTEM AND METHOD FOR CONSTRUCTING DIGITAL DOCUMENTS

(71) Applicant: InCloud, LLC, San Francisco, CA (US)

(72) Inventors: Mitchell Spierer, San Francisco, CA (US); Hadayatullah Seddiqi, Los Angeles, CA (US); Charles Chi, Henderson, NV (US); Alastair Doggett, Culver City, CA (US); Roopeswar Kommalapati, Miami, FL (US)

(73) Assignee: InCloud, LLC, San Francisco, CA (US)

( * ) Notice: Subject to any disclaimer, the term of this patent is extended or adjusted under 35 U.S.C. 154(b) by 0 days.

(21) Appl. No.: 17/835,412

(22) Filed: Jun. 8, 2022

(65) Prior Publication Data

US 2022/0391576 A1    Dec. 8, 2022

Related U.S. Application Data

(60) Provisional application No. 63/208,422, filed on Jun. 8, 2021.

(51) Int. Cl.
*G06F 40/263* (2020.01)
*G06F 40/166* (2020.01)
*G06N 20/00* (2019.01)

(52) U.S. Cl.
CPC .......... *G06F 40/166* (2020.01); *G06F 40/263* (2020.01); *G06N 20/00* (2019.01)

(58) Field of Classification Search
None
See application file for complete search history.

(56) References Cited

U.S. PATENT DOCUMENTS

| 10,762,301 | B1 * | 9/2020 | Johnson | G06F 40/40 |
| 2004/0268236 | A1 * | 12/2004 | Chidlovskii | G06F 40/143 715/234 |
| 2015/0095770 | A1 * | 4/2015 | Mani | G06F 16/93 715/254 |
| 2019/0266231 | A1 * | 8/2019 | Banerjee | G06N 3/045 |
| 2019/0317993 | A1 * | 10/2019 | Toda | G06F 40/14 |
| 2020/0327197 | A1 * | 10/2020 | Bhowal | G06N 5/041 |
| 2021/0294828 | A1 * | 9/2021 | Tomkins | G06F 16/2237 |

(Continued)

FOREIGN PATENT DOCUMENTS

GB    2494100 A  *  3/2013  ............. G09B 19/06

*Primary Examiner* — Xuyang Xia
(74) *Attorney, Agent, or Firm* — Wolf, Greenfield & Sacks, P.C.

(57) ABSTRACT

In some aspects described herein, a computer-based system that is capable of constructing digital documents is provided. In some implementations, a machine learning system is provided that learns certain terms within a document. The terms may be, for example, part of a document that forms a legally-binding contract between two entities. In one implementation of the machine learning system, the machine learning system interoperates within a user interface to show predictions of certain terms within the document to the user. Further, the machine learning system may capture user answers relating to certain terms and provide feedback into the system that learns during operation of the system, improving user interactions, accuracy and reducing the number of user interactions.

17 Claims, 15 Drawing Sheets

(56) References Cited

U.S. PATENT DOCUMENTS

2022/0317979 A1* 10/2022 Araujo Soares .......... G06F 8/33
2023/0081077 A1* 3/2023 Moriya ............... G06F 16/2246
　　　　　　　　　　　　　　　　　　　　　　715/256

* cited by examiner

FIG. 6

| Anatomy — 701 | Preferred Position — 702 | Fallback Position — 703 |
|---|---|---|
| non_solicitation | True | True } 704 |
| carveouts | True | False |
| former_employees | True | False |
| cooldown_period | 6 months | } 705 |
| general_advertising | True | False |
| placement_agency | False | False |
| unsolicited_contact | True | False |
| covered_employees | | |
| all_employees | True | False } 706 |
| custom | True | True |
| senior_management | True | True |

FIG. 7

| Anatomy | Party A Preferred | Party A Fallback | Party B Preferred | Party B Fallback | Negotiated |
|---|---|---|---|---|---|
| non_solicitation | True | True | False | True | True |
| carveouts | | | | | |
| former_employees | True | False | False | True | True |
| cooldown_period | 6 months | | | 6 months | 6 months |
| general_advertising | True | False | False | False | False |
| placement_agency | False | False | False | False | False |
| unsolicited_contact | True | False | False | True | False |
| covered_employees | | | | | |
| all_employees | True | False | False | False | False |
| custom | True | True | | True | True |
| senior_management | True | True | | False | No Solution |

SYSTEM AND METHOD FOR CONSTRUCTING DIGITAL DOCUMENTS

CROSS-REFERENCE TO RELATED APPLICATIONS

This Application is a Non-Provisional of Provisional (35 USC 119(e)) of U.S. application Ser. No. 63/208,422, filed Jun. 8, 2021, entitled "SYSTEM AND METHOD FOR CONSTRUCTING DIGITAL DOCUMENTS", which is hereby incorporated by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

There are a number of existing systems that are capable for assisting user in creating and editing electronic documents.

SUMMARY

It is appreciated that it would be beneficial to provide additional tools to assist users in creating documents more efficiently. In some cases, the time spent creating, reviewing, and comparing documents by expensive experts such as attorneys is cost prohibitive. Therefore, different aspects described herein relate to providing systems for processing digital documents more efficiently, requiring less user operations and time. In some aspects described herein, a computer-based system that is capable of constructing digital documents is provided. In some embodiments, a machine learning system is provided that learns certain terms within a document. The terms may be, for example, part of a document that forms a legally-binding contract between two entities.

In one implementation of the machine learning system, the machine learning system interoperates within a user interface to show predictions of certain terms within the document to the user. Further, the machine learning system may capture user answers relating to certain terms and provide feedback into the system that learns during operation of the system. Because of this "human in the loop" configuration, the machine learning system is capable of serving new predictions or suggestions to users without code changes and offline retraining. Further, in some implementations, the same user interface may be used to perform and show data labeling of terms within the document as well as train new machine learning models. The user interface may also include components that optimize effectiveness of predictions based on processing speed (e.g., provide, to the user within the interface, an accurate prediction within an acceptable timeframe).

In some embodiments, a system is provided that creates a digital framework for creating documents. The system defines and stores a taxonomy of terms which is used to construct new documents by users. In some implementations, the taxonomy defines a hierarchy of terms which have legal relations and meaning. The taxonomy is used to construct digital representations of electronic documents.

The system may also be able to define different meanings to terms across many different vertical applications. In some embodiments, terms defined within the taxonomy that may be used in a document by a user may be assigned relative strength between them, so that they may be compared with each other and used within the document. In some embodiments, such terms may be alternatives for a possible type of term that may be used within a contract (e.g., limitation of liability, etc.). Further, in other embodiments, the taxonomy may include mappings of terms between languages to provide a language agnostic framework such that documents may be produced easily within different languages, as well as using the framework to negotiate contracts between entities that speak different languages.

In some embodiments, the system may maintain an anatomy of a document. The anatomy may include a "scorecard" that serves as a summary of terms in the document. The anatomy structure may include, for example, one or more types of terms, parameters, and other elements. In some embodiments, the anatomy structure may include hierarchical sets of clauses and terms. The system may include an interface that queries a user to build a particular scorecard for a document.

In some embodiments, a system for determining a computable contract that can be auto-negotiated without attorney (or other human) involvement in the negotiation process is provided. In some embodiments, the system may define a digital representation of a "playbook" which defines, in a distributed computer system, rules about how a contract should be negotiated. The "playbooks" of two separate parties may be used by the platform to auto-negotiate a contract. The system may also provide a capability of automatically identifying key terms in a contract and compare against a digitized playbook, and providing output to some entity, such as a user or computer system. Further, the system may be capable of overlaying digitized playbook terms on a legal document and displaying that overlay to a user.

In some aspects, a computer system is provided comprising a processor, a memory, and computer instructions, when executed, cause the computer system to provide a system for managing digital documents, the system for managing digital documents being programmed to define a data model defining a hierarchy of terms, create at least one document, including the hierarchy of terms, permit a user to selectively choose terms from the hierarchy of terms to form the at least one document. In some embodiments, the system is configured to compare at least two of the hierarchy of terms based on a relative strength between the at least two terms.

In some embodiments, the system is configured to auto-negotiate terms of the at least one document between at least two entities. In some embodiments, the system is adapted to define, for each of the at least two entities, a playbook that identifies parameters by which the at least one document should be negotiated by the system.

In some embodiments, the system further comprises a machine learning element that is adapted to suggest at least one term among the hierarchy of terms for inclusion in the at least one document. In some embodiments, the machine learning element is configured to train responsive to user input provided to the system. In some embodiments, the machine learning element is configured to train and adapt responsively to user input provided to the system in a feedback loop.

In another aspect, a computer system is provided comprising a processor, a memory, and computer instructions, when executed, cause the computer system to provide a system for managing digital documents, the system for managing digital documents being programmed to define a data model defining a plurality of terms, create at least one document, including the plurality of terms, permit a user to selectively choose terms from the plurality of terms to form the at least one document, and wherein the system further comprises a machine learning element that is adapted to suggest at least one term among the plurality of terms for inclusion in the at least one document. In some embodiments, the plurality of terms includes a hierarchy that relates the plurality of terms.

In some embodiments, the system is configured to compare at least two of the hierarchy of terms based on a relative strength between the at least two terms. In some embodiments, the system is configured to auto-negotiate terms of the at least one document between at least two entities. In some embodiments, the system is adapted to define, for each of the at least two entities, a playbook that identifies parameters by which the at least one document should be negotiated by the system.

In some embodiments, the system further comprises a machine learning element that is adapted to suggest at least one term among the hierarchy of terms for inclusion in the at least one document. In some embodiments, the machine learning element is configured to train responsive to user input provided to the system. In some embodiments, the machine learning element is configured to train and adapt responsively to user input provided to the system in a feedback loop.

According to one aspect a computer system is provided. The system comprises a processor, a memory, computer instructions, when executed, cause the computer system to provide a system for managing digital documents, the system for managing digital documents being programmed to: define a data model defining a hierarchy of terms, create at least one document, including the hierarchy of terms, and permit a user to selectively choose terms from the hierarchy of terms to form the at least one document. According to one embodiment, the system is configured to compare at least two of the hierarchy of terms based on a relative strength between the at least two terms. According to one embodiment, the system is configured to auto-negotiate terms of the at least one document between at least two entities.

According to one embodiment, the system is adapted to define, for each of the at least two entities, a playbook that identifies parameters by which the at least one document should be negotiated by the system. According to one embodiment, the system further comprises a machine learning element that is adapted to suggest at least one term among the hierarchy of terms for inclusion in the at least one document. According to one embodiment, the machine learning element is configured to train responsive to user input provided to the system. According to one embodiment, the machine learning element is configured to train and adapt responsively to user input provided to the system in a feedback loop.

According to one aspect a method is provided. The method comprises defining a data model defining a hierarchy of terms associated with electronic documents, creating at least one electronic document, including the hierarchy of terms, and permitting, within a computer interface, a user to selectively choose terms from the hierarchy of terms to form the at least one electronic document. According to one embodiment, the method further comprises an act of comparing, by a computer system, at least two of the hierarchy of terms based on a relative strength between the at least two terms. According to one embodiment, the method further comprises an act of auto-negotiating, by a computer system, terms of the at least one electronic document between at least two entities. According to one embodiment, the method further comprises an act of defining, for each of the at least two entities, a playbook that identifies parameters by which the at least one electronic document should be negotiated by the computer system. According to one embodiment, the method further comprises an act of suggesting, by a machine learning element, at least one term among the hierarchy of terms for inclusion in the at least one electronic document. According to one embodiment, the method further comprises an act of training the machine learning element responsive to user input provided to the system. According to one embodiment, the method further comprises an act of training the machine learning element responsively to user input provided to the system in a feedback loop.

According to one aspect, a non-transitory computer-readable medium, that when executed by at least one processor, performs a method is provided. The method comprises defining a data model defining a hierarchy of terms associated with electronic documents, creating at least one electronic document, including the hierarchy of terms, and permitting, within a computer interface, a user to selectively choose terms from the hierarchy of terms to form the at least one electronic document.

According to one aspect, a computer system is provided. The system comprises a processor, a memory and computer instructions, when executed, cause the computer system to provide a system for managing digital documents, the system for managing digital documents being programmed to: define a data model defining a plurality of terms, create at least one document, including the plurality of terms and permit a user to selectively choose terms from the plurality of terms to form the at least one document, and wherein the system further comprises a machine learning element that is adapted to suggest at least one term among the plurality of terms for inclusion in the at least one document. According to one embodiment, the plurality of terms includes a hierarchy that relates the plurality of terms. According to one embodiment, the system is configured to compare at least two of the hierarchy of terms based on a relative strength between the at least two terms. According to one embodiment, the system is configured to auto-negotiate terms of the at least one document between at least two entities.

According to one embodiment, the system is adapted to define, for each of the at least two entities, a playbook that identifies parameters by which the at least one document should be negotiated by the system. According to one embodiment, the system further comprises a machine learning element that is adapted to suggest at least one term among the hierarchy of terms for inclusion in the at least one document. According to one embodiment, the machine learning element is configured to train responsive to user input provided to the system. According to one embodiment, the machine learning element is configured to train and adapt responsively to user input provided to the system in a feedback loop.

According to one aspect, a method is provided. The method comprises defining a data model defining a hierarchy of terms associated with electronic documents, creating at least one electronic document, including the hierarchy of terms; and permitting, within a computer interface of a computer system, selectively choose terms from the plurality of terms to form the at least one electronic document, and wherein the system further comprises a machine learning element that is adapted to suggest at least one term among the plurality of terms for inclusion in the at least one electronic document.

According to one embodiment, the plurality of terms includes a hierarchy that relates the plurality of terms. According to one embodiment, the method further comprises an act of comparing, by the computer system, at least two of the hierarchy of terms based on a relative strength between the at least two terms. According to one embodiment, the method further comprises an act of auto-negotiating, by a computer system, terms of the at least one electronic document between at least two entities. According to one embodiment, the method further comprises an act of defining, for each of the at least two entities, a playbook that identifies parameters by which the at least one electronic document should be negotiated by the computer system. According to one embodiment, the method further comprises an act of suggesting, by a machine learning element, at least one term among the hierarchy of terms for inclusion in the at least one electronic document.

According to one embodiment, the method further comprises an act of training the machine learning element responsive to user input provided to the system. According to one embodiment, the method further comprises an act of training the machine learning element responsively to user input provided to the system in a feedback loop.

According to one aspect a non-transitory computer-readable medium, that when executed by at least one processor, performs a method is provided. The method comprises defining a data model defining a hierarchy of terms associated with electronic documents, creating at least one electronic document, including the hierarchy of terms, and permitting, within a computer interface of a computer system, selectively choose terms from the plurality of terms to form the at least one electronic document, and wherein the system further comprises a machine learning element that is adapted to suggest at least one term among the plurality of terms for inclusion in the at least one electronic document.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

Still other aspects, examples, and advantages of these exemplary aspects and examples, are discussed in detail below. Moreover, it is to be understood that both the foregoing information and the following detailed description are merely illustrative examples of various aspects and examples and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed herein with reference to the accompanying figures, which are not intended to be drawn to scale. The figures are included to provide illustration and a further understanding of the various aspects and embodiments and are incorporated in and constitute a part of this specification but are not intended as a definition of the limits of the invention. Where technical features in the figures, detailed description or any claim are followed by references signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. In the figures:

FIG. 6 shows an example user interface having a primary interface containing one or more viewing sections according to various embodiments;

FIG. 7 shows an example schematic for a digital playbook according to various embodiments;

FIG. 8 shows an example data schematic relating to data elements used for auto-negotiations between two parties according to various embodiments;

FIG. 9 shows an example user interface having a primary interface containing one or more viewing sections according to various embodiments;

FIG. 10 shows another example user interface used to interact with a structured document according to various embodiments;

FIG. 11 shows another example user interface used to interact with a structured document according to various embodiments;

FIG. 12 shows another example user interface used to interact with a structured document according to various embodiments;

FIG. 13 shows another example user interface used to interact with a structured document according to various embodiments;

DETAILED DESCRIPTION

Various aspects relate to a software-based system and methods for creating and managing digital documents. Such documents may include, for example, electronically stored documents that are created, shared, manipulated and viewed on a computer system. In some embodiments, it is appreciated that such documents may have legal significance and may include one or more terms within them which create a composite legal document that defines rights and/or obligations for one or more legal entities. In some examples, the legal document may be a contract, non-disclosure agreement, assignment, license, or other type of document that can be interpreted electronically. Systems may be provided that allow users to process digital documents more efficiently, requiring less user-computer operations and user time.

In some embodiments, computer-based infrastructure may be provided that permits users to interactively operate on electronically-stored documents. Improvements may relate to improved platforms, processes, interfaces, machine learning components, data structures and other aspects discussed by way of example below.

Anatomy

Figure 1:
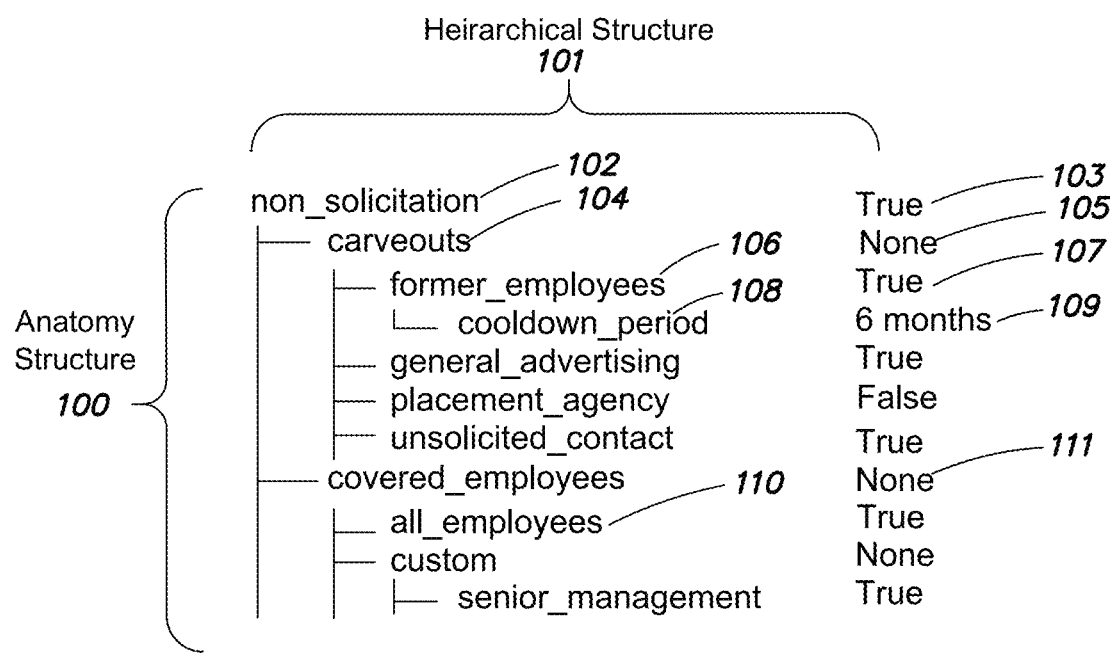
FIG. 1 shows a block diagram of an example anatomy structure that may be used to represent document portions, according to some embodiments.

In some embodiments, an anatomy of an electronic document is defined that expresses the legal construction of the electronic document. The anatomy structure may include, for example, one or more types of terms, parameters, and other elements. In some embodiments, the anatomy structure may include hierarchical sets of clauses and terms as shown by way of example in FIG. 1. In particular, FIG. 1 shows an anatomy structure 100 in which electronic documents representing contracts may be structured. It should be appreciated that documents such as contract can be used, other types of electronic documents may be processed using aspects described herein, and the invention is not limited to any particular type of document unless identified in the claims.

In the example shown in FIG. 1, the anatomy structure 100 is provided that includes one or more terms arranged in a hierarchical structure 101. This hierarchical structure may be used to formulate all or part of an electronic document. For example, in the hierarchical structure 101, an example subset of an anatomy for non-solicitation provisions is shown. This structure 100 describes the format and content of an electronic document, and in some embodiments is used to control how the electronic document is created, processed and compared with other documents.

The hierarchical structure 101 may include a hierarchical arrangement of terms (e.g., terms 104, 106, 108, 110, etc.). In some embodiments, terms used are codenames or short forms of the term, since the question or phraseology form relating to the term can be long. The column on the right are example values (e.g., values 103, 105, 107, 109, etc.) for the associated terms, and in some embodiments, these values are stored within an electronic representation of the anatomy structure 100.

The anatomy structure 100 may be stored and associated with an actual document (e.g., an electronic document representing a contract), or may form part of that document (e.g., metadata). Such information may be stored within or separate to the actual resulting electronic document. In some implementations, the question form may be encoded in a separate document or database. In some implementations, the hierarchical structure may be interpreted by a computer to automatically generate a document or perform any other processing relating to the electronic document.

In some embodiments, terms of structured documents may have different term values, such as true/false (e.g., values 103, 107), may indicate the presence or absence of a term (e.g., covered employees (110), value 111 is "none"), a time period, range or value (e.g., value 109 is "6 months") or other qualifier or parameter value. Because terms may have parameter values, this ability to parameterize terms provided additional functionality.

As discussed, some electronic document types that may be processed include contracts. Once contracts can be translated into an anatomy structure, there are many "computations" that can be done by the system. For example, the system may be configured to:

Compare drafts of a contract during a negotiation to track changing terms

Analyze a set of contracts to determine obligations

Define "playbooks" in terms of anatomy to check compliance of contracts with the playbook for reducing mistakes In some implementations, it is appreciated that anatomized contracts and their structure can create a lot of functional value during the negotiation process as well as after, reducing user time and computational effort.

Data Model

In some example implementations, the anatomy is a represented by a graph whose structure is tree-like. Modeling trees relationally can be performed, and the system may be configured to serve questions, answers, and predictions as well. For machine learning functions, the tree structure is convenient because, in some implementations, the tree structure may include and encode fallback logic for clause detection from smaller to larger granularity.

Logic that does not follow the hierarchical parent-child relationship between terms presents a challenge as it breaks the tree structure. For instance, some clauses specify values that may depend on other semantically unrelated clause values. Graphs implemented with relational databases are generally difficult to work with, though possible, in addition to an implementation within a graph database or a custom file serialization format. In making the graph available to other consumers of the data product, it is also possible to implement some combination of these formats for storage and create in-memory data structures that are then retrieved using a remote procedure call (RPC) served over a network protocol such as HTTP or GRPC.

Figure 2:
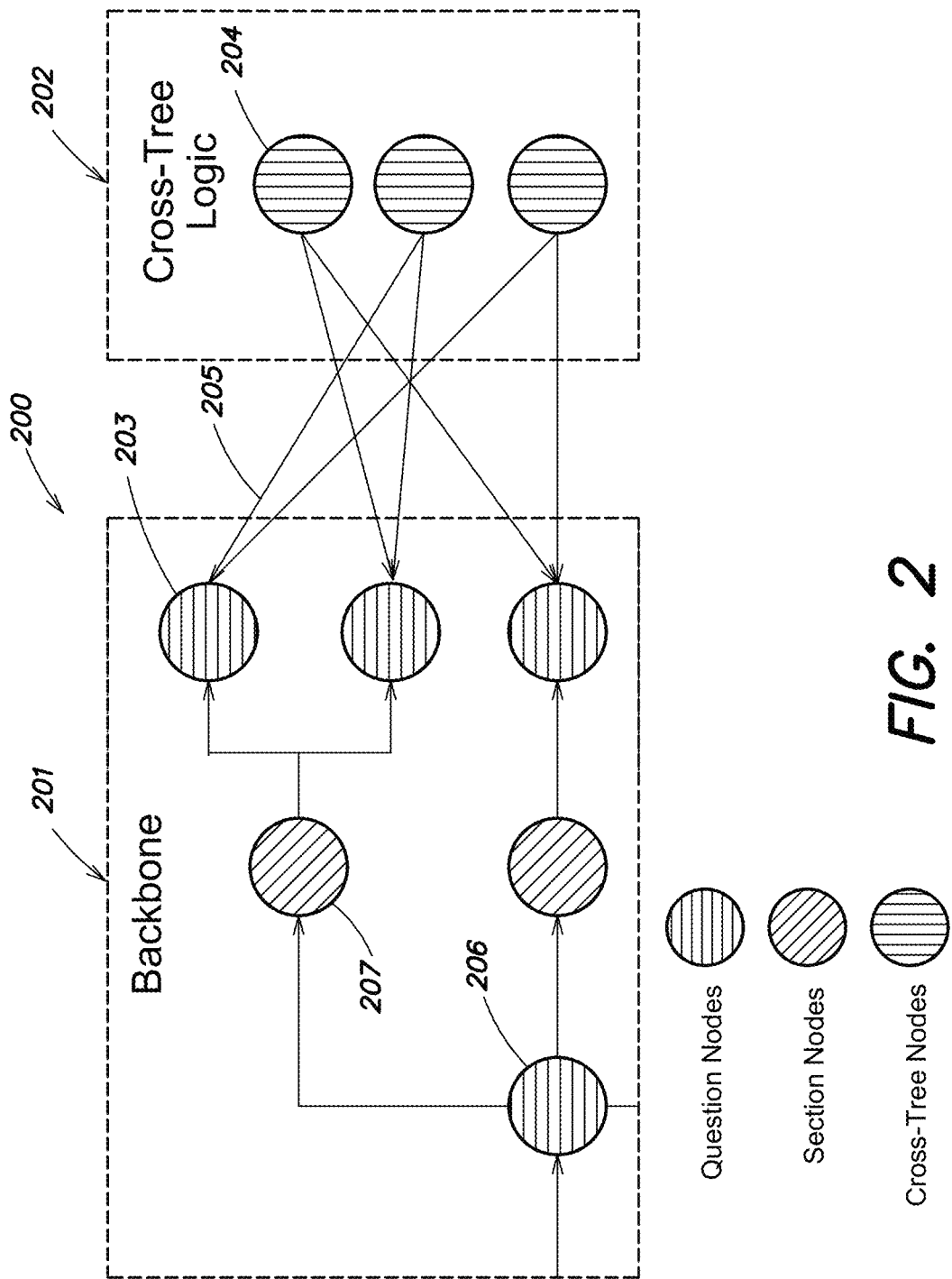
FIG. 2 shows an example graph decomposition structure according to various embodiments.

Given that the backbone of the representation is, in some example implementations, tree-like, the graph structure can be decomposable into a tree component and other subgraphs. FIG. 2 shows one example implementation 200 of a graph structure according to various embodiments. In particular, the graph decomposition includes several structures, including a backbone structure 201 and cross-tree logic 202. The backbone structure 201 contains question nodes (e.g., node 206) and section nodes (e.g., node 207) that have a tree-like dependency structure. Cross-tree nodes (e.g., node 204) connect only a few of these backbone nodes together (e.g., as represented through links or references (e.g., 205)) and may be independent of other playbook nodes.

Example Implementation

Figure 3:
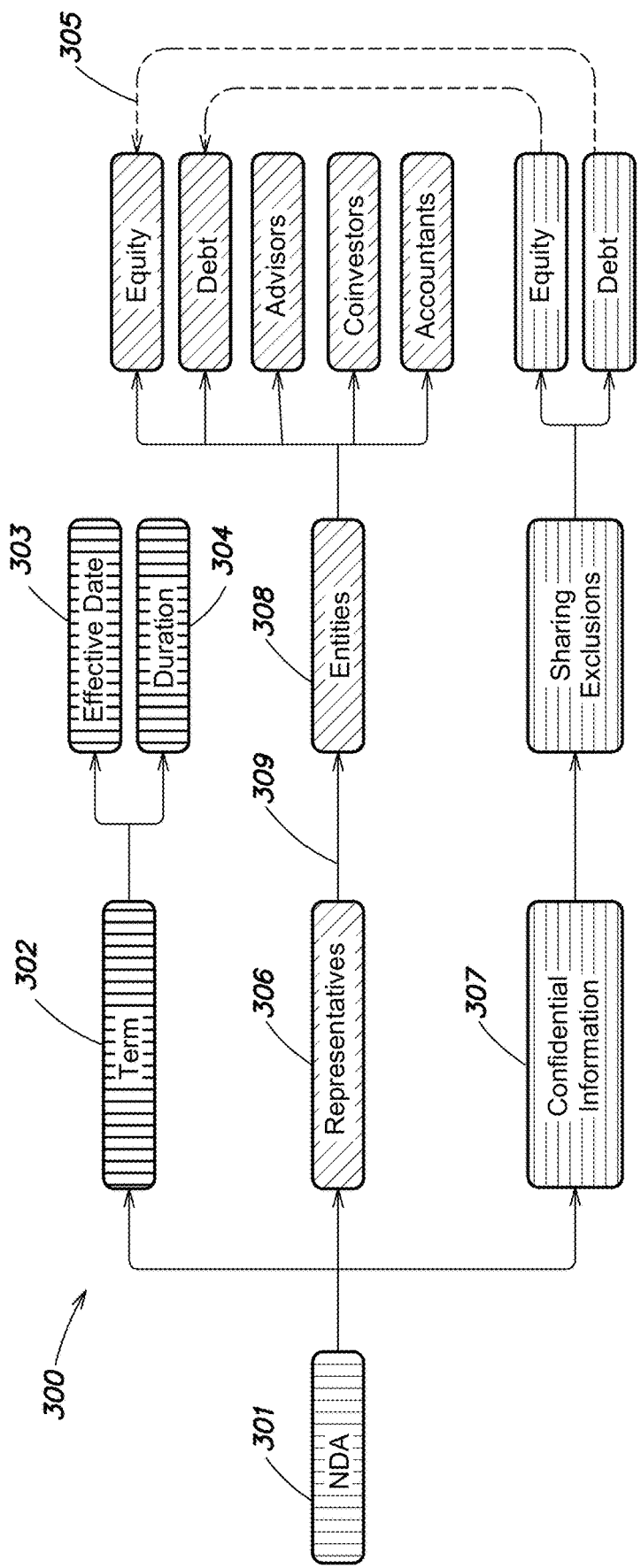
FIG. 3 shows an example one example graph structure that describes a structure associated with an NDA according to various embodiments.

In one example implementation of the graph structure, a nondisclosure agreement document (NDA) may be described using the graph decomposition structure as shown above with reference to FIG. 2. In particular, FIG. 3 shows one example graph structure 300 that describes a structure associated with an NDA. In particular, the graph structure 300 shows a portion of an NDA anatomy (element 301) having a main tree structure along with the added dependencies across subtrees. The boxes (e.g., elements 306, 307, 308) denote anatomy terms, solid arrows (e.g., element 309) denote anatomy structure from parent to child, and dotted arrows (e.g., element 305) represent cross-tree logic as previously indicated in FIG. 2.

In the example shown, each cross-tree logic node ties together only a small number of questions with an operator. Correspondingly, in the example, these nodes have small degree (few neighbors), and there is not usually any depth (e.g., paths are single-hop). In some embodiment, this representation simplifies storage and querying enough to work in a relational paradigm where the backbone can be stored in a self-referential flat table, and cross-tree logic can be stored as edge maps separately or in different data structures. Both can be combined to create a full anatomy graph.

The schematics show two variants of logic representation: one in which specialized nodes define operations between its neighboring nodes, and another in which anatomy terms relate to other terms by way of specialized edges. Either can be used mutually exclusively or combined for more powerful expression of logical operations between anatomy nodes.

The anatomy data models allow for the assignment of multiple properties and functions to each term represented as a node in the anatomy graph. Node properties may include its name as a codeword, an expression of the term as a question, its value (i.e., answer to the question form) in the context of a contract or playbook, the data type of its value (e.g., boolean, date, date-delta, single or multiple entities, percentages, currency), an expression of the term as a statement used along with its value, preferred language, a long-form description, synonyms, and keywords. In some embodiments, node functionality may include algorithms and machine learning models for translating natural-language documents, paragraphs, sentences, and words into a text span that only relates to the given node, and algorithms and machine learning models for determining the value (answer to question form) given the related text span.

Human-in-the-Loop System (HITL)

In some embodiment, the anatomy structure provides additional structure for natural-language contracts to be mapped into. That is, natural-language documents (e.g., prepared through other processes, with or without human involvement) may be translated or mapped into a an anatomy structure (e.g., anatomy structure 100 as discussed above with reference to FIG. 1). In accordance with some embodiments, the mechanism of translation can be manual (e.g., in the case of contracts or other documents, using legal experts such as attorneys), or automated using machine learning algorithms that perform the mappings. A human-in-the-loop (HITL) paradigm describes how such a system can bootstrap from a largely or entirely manual process to a partially or fully automated one.

An anatomy structure can be a subset of the information that is used to describe natural-language contracts or other document types. To develop a fully functional anatomy structure may require bootstrapping from an initial effort and continuously improvement over time. In some embodiments, an HITL system then becomes a subcomponent of a system that both optimizes the construction of anatomies and translations of natural-language contracts into their anatomy.

Figure 4:
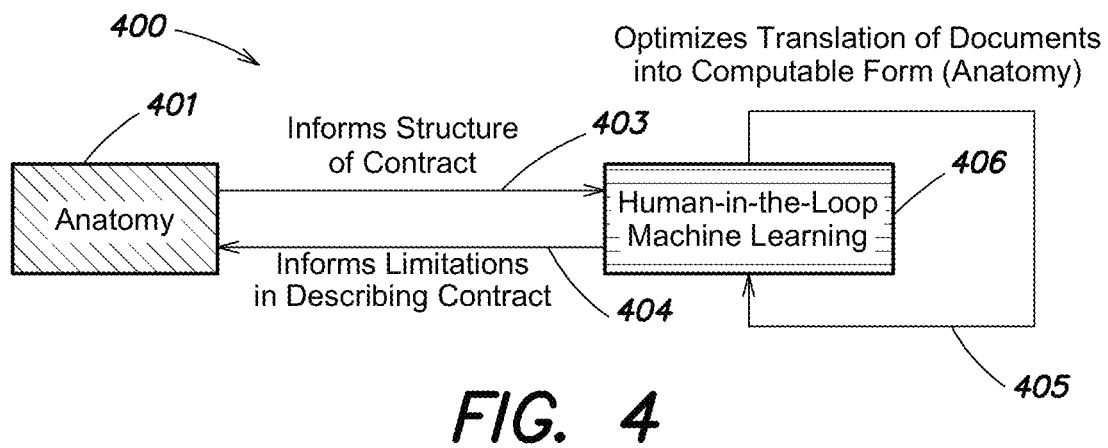
FIG. 4 shows an example process where an anatomy is created according to various embodiments.

FIG. 4 shows one example process 400 where an anatomy 401 is created using an HITL system. For example, an anatomy 401 may be created and improved using the HITL system (e.g., a human-in-the-loop machine learning system 406). In the example shown, the autonomy may be created and/or improved from system 406 by optimizing a translation of documents into computable form (e.g., an anatomy) as performed by step 405. One or more machine learning models may be trained to improve different aspects of the anatomy. Such models may be trained using previous versions of anatomies developed from one or more documents or processes. In some embodiments, the HITL system optimizes the translation until it reaches, in some cases, the limits of clause definitions available to it from the anatomy. From these eventual limitations emerges a need for an extension and improvement to an anatomy.

Figure 5:
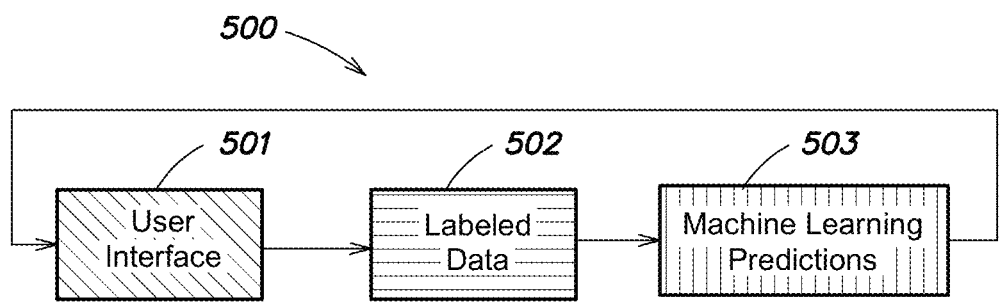
FIG. 5 shows an example process performed by a human-in-the-loop (HITL) system that uses interface data to facilitate a translation of a natural-language contract into an anatomy according to various embodiments.

In some embodiment, it is appreciated that the anatomy structure may be improved using one or more user inputs. FIG. 5 shows one embodiment of a process 500 performed by an HITL system that uses interface data to facilitate a translation of a natural-language contract into an anatomy by asking the user to answer questions derived from the anatomy structure itself. As discussed above, there may be a portion of the anatomy structure that describes a question or other user interface element used to derive the document structure from a human user. Information collected by user interface 501 (e.g., through question information and/or other user inputs) generate labeled data 502 which can be used to train machine learning models to generate predictions 503 which then feed back to the user interface 501. With more iterations of the loop the dataset grows in size, resulting in improved predictions and faster or in some cases automatic execution of the business goal originally enabled by the user interface 501.

User Interfaces

Figure 6:
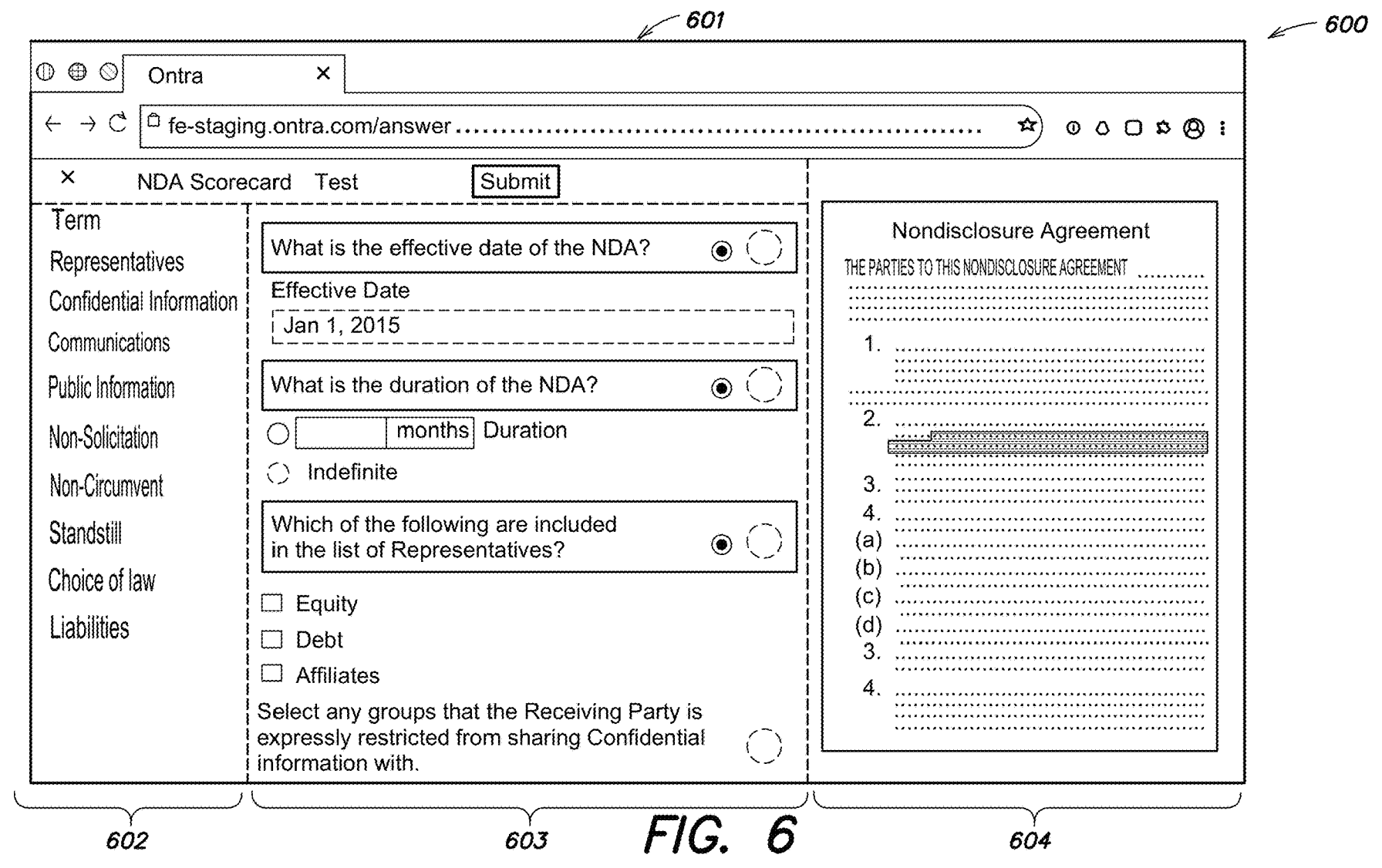

As discussed above, some aspects relate to systems for presenting and obtaining information from a user in association with a creation of an anatomy structure for describing documents. FIG. 6 shows an example user interface 600 having a primary interface 601 (e.g., a window) containing one or more viewing sections. Interface 601 may include, for example, a section 602 that may show one or more hierarchical portions of the anatomy (e.g., elements of the anatomy structure). These may be represented, for example, by selectable portions of the interface that permit the user to view the anatomy structure.

Interface 601 may also include a second portion 603 that shows questions or other interface elements that have been derived from the anatomy structure. Interface 601 may also include an interface portion 604 that displays the actual natural language document (e.g., a contract such as an NDA). The interface may include one or more controls that permit the user to interact and view the different hierarchical areas of the document. The sections may be linked visually in that an action performed within one area may affect, highlight, change or perform an action in other areas. For example, if a question is selected in the question area of the interface, a corresponding term may be highlighted within a rendering of the natural language document (e.g., the NDA).

Digital Playbooks

According to some embodiments, it is appreciated that the anatomy structure that describes documents allows for automatic functions that may be performed by use of a computer. In conjunction with this format, an additional data structure may be defined that permits the creation of a common document between two separate entities (e.g., a contract negotiated between two parties). Although such systems may be used to negotiate a contract, however, it should be appreciated that such an approach may be used that defines a common protocol that is used to determine common parameters among one or more entities.

In some embodiments described here, playbooks may be defined that include one or more documents that define preferences for a negotiation. In some embodiments, digital playbooks define preferences in the language of the anatomy structure. It can be appreciated that unifying negotiation preferences and the contents of a contract in the same anatomy data structure enables standardization across negotiating parties, a data-driven determination of the system of market positions, negotiation performance analytics, compliance of playbook terms for a contract undergoing negotiation, redlining aids and recommendations, and automatic negotiation can be performed between two parties that have digital playbooks in the system.

FIG. 7 shows one embodiment of a schematic 700 for a digital playbook which is related to one or more terms of an anatomy structure (e.g., anatomy structure 100). In this digital playbook representation, there are one or more parameters that identify limits to particular elements of the anatomy. For instance, a data structure may be defined that relates different negotiation positions for particular elements of the anatomy.

As shown in FIG. 7, in an example anatomy 701, there may be one or more positions (e.g., preferred position 702, fallback position 703) defined that describe acceptable limits of values that may be auto-negotiated between two different parties. Such positions may define values, such as true/false (e.g., elements 704), absolute values or ranges (e.g., element 705 being defined by 6 months), or other type of value. In some embodiments, digital playbook representations assign values to anatomy terms for a set of positions. In this example case, the set of positions can be preferred and fallback positions.

Automatic Negotiation

Automatic negotiation, or auto-negotiate, according to some embodiments, includes an application of two or more digital playbooks and an optimization scheme for the system to decide which values to assign for each term in the anatomy of the contract under negotiation. From these values, a natural-language contract can be generated manually by an attorney or automatically by the system if anatomy terms are given preferred language text for each term.

According to some embodiments, an auto-negotiate function becomes possible through the comparison of two digital playbook representations. Generation of solutions that adhere to both playbooks can be done manually by an attorney or automatically by the system when programmed with the corresponding rules. In one simple example, automation of a solution generation includes finding matching anatomy term values across any position for both sides.

It should be appreciated that not all terms may be negotiable automatically by the system. In some cases, negotiation preferences exceed the ability to express of an anatomy, or a common solution cannot be found using the rules of solution generation. Whether an artifact of a limited anatomy, insufficient rules for a term, or the inherent impossibility of common ground in the negotiation given the two playbooks, the system reports when a solution cannot be found. However, it should be appreciated that the number of user cycles to find acceptable positions is significantly reduced. In a case where some positions may not be automatically negotiated, some manual intervention may be required by an attorney. In some cases, some other logic or messaging may be performed to help assist in finding a common position.

Once the contract is auto-negotiated by assigning these values for each anatomy term, the system can translate the anatomy back to a natural-language form. This may be done by an attorney or by the system itself in a more efficient manner. In either case, language must be taken either from the digital playbook or other database (e.g., a clause library) to reconstruct the natural-language contract.

FIG. 8 shows an example data schematic relating to data elements used for auto-negotiations between two parties (e.g., Party A 802 and Party B 803). The result of the auto-negotiation is a negotiated position 804. For example, for a non-solicitation term, a Party A may have a preferred position of true, and a fallback position of true (e.g., Party A wants a non-solicitation term in any case). Party B may have, for the same non-solicitation term, a preferred position of false, and a fallback position of true. The negotiated position value would be true, as it is the intersection of the solutions.

In the example data structure, the anatomy 801 defines the term in each row. Values for two positions (e.g., preferred and fallback) are provided for a Party A and Party B who are on opposite sides of the negotiation. The auto-negotiated terms are given values in the final negotiated column by computing all possible solutions given the party preferences. In some embodiments, where there is more than one solution for a term, there may be provided methods for choosing a solution among a number of possible solutions. In some cases, a solution may be chosen at random, but in other cases, more sophisticated techniques may be used, e.g., average or middle values, alternating higher or lower common values by each party, heuristics, output of a statistical model, or other method. When a solution does not exist (final row), the system alerts this case by writing "no solution" (e.g., within negotiated column 804 at element 807).

User Interfaces

Figure 9:
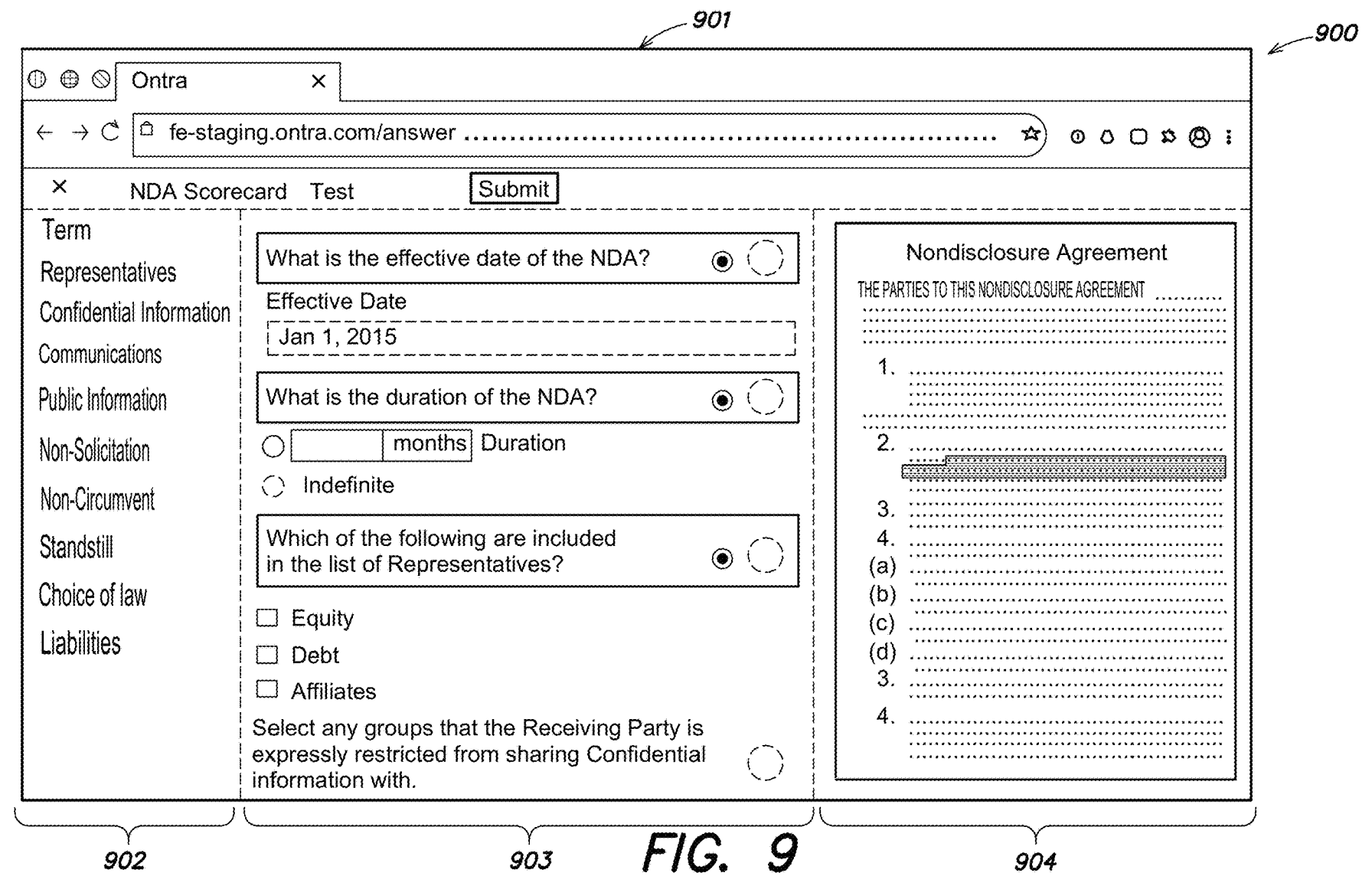

As discussed above, some aspects relate to systems for presenting and obtaining information from a user in association with a creation of an anatomy structure for describing documents. Similar to the interface 600 shown by way of example in FIG. 6, FIG. 9 shows an example user interface 900 having a primary interface 901 (e.g., a window) containing one or more viewing sections. Interface 901 may include, for example, a section 902 that may show one or more hierarchical portions of the anatomy (e.g., elements of the anatomy structure). These may be represented, for example, by selectable portions of the interface that permit the user to view the anatomy structure.

Interface 901 may also include a second portion 903 that shows questions or other interface elements that have been derived from the anatomy structure. Interface 901 may also include an interface portion 904 that displays the actual natural language document (e.g., a contract such as an NDA). The interface may include one or more controls that permit the user to interact and view the different hierarchical areas of the document.

According to some embodiments, the interface 901 may implement AI aspects to assist in user input. As discussed, according to some implementations, the user interface may access the anatomy structure, and may also provide AI predictions to a user responsive to input. In some example implementations, the UI may serve AI predictions as the user interacts within the interface.

Figure 10:
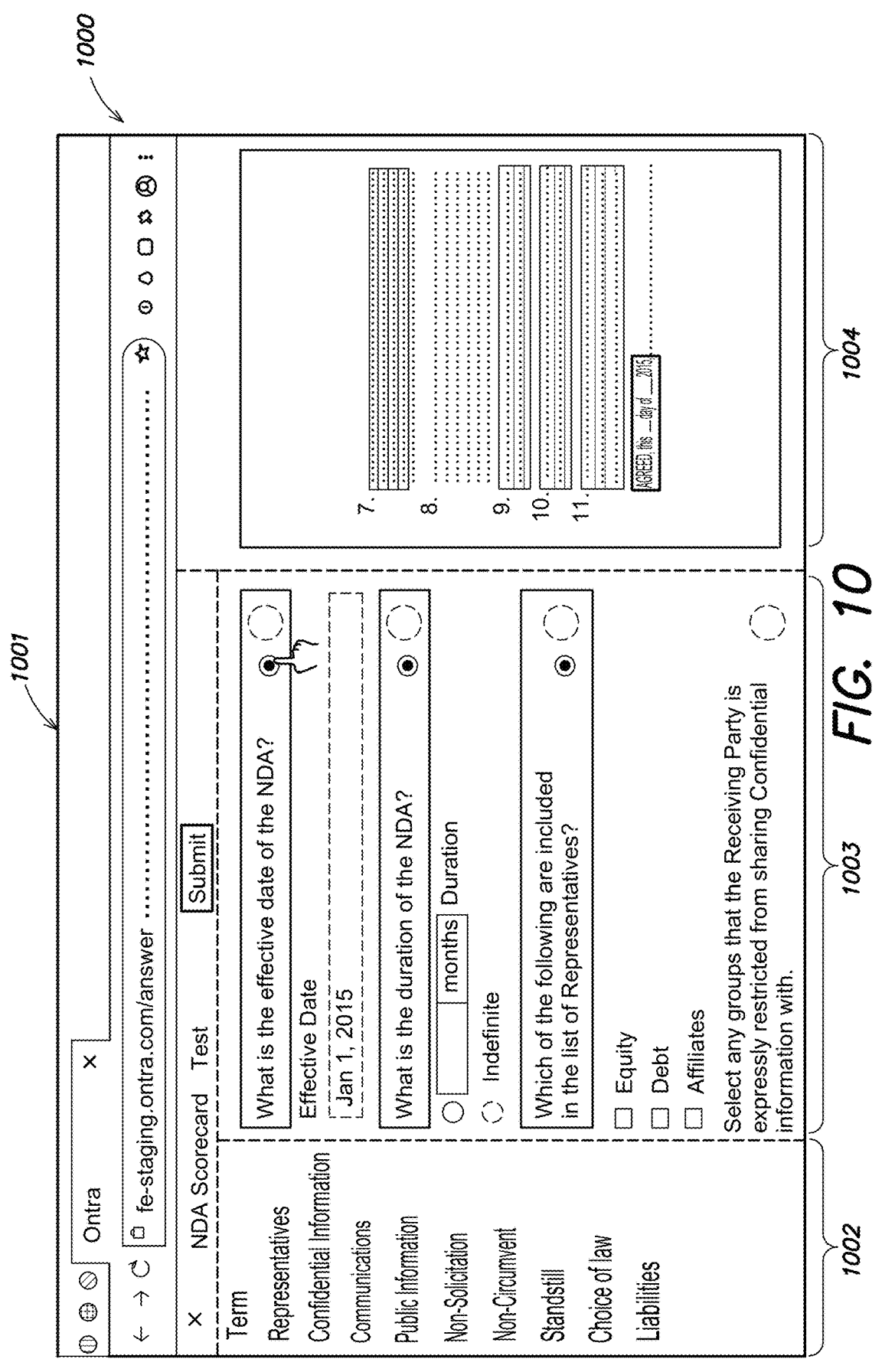

According to some embodiments, the user interface performs operations in some areas of the interface in response to others. For instance, as shown by way of example in FIG. 10 (which also includes an interface 1001 that shows sections (e.g., term hierarchy area 1002 on the left, questions area 1003 in the middle and the document view area 1004 on the right)), if a user's selection control (e.g., mouse pointer) is positioned over a portion of the questions (e.g., effective date of the NDA), the document view area jumps to a relevant prediction within the interface, and highlights relevant text within the document. In some embodiments, predicted entry information may be visually designated within the interface (e.g., indicated by a visual indicator such as by a dotted box). In some example implementations, the interface may show machine learning predictions, with the prediction shown where applicable (e.g., effective date prediction value "Jan. 1, 2015").

Figure 11:
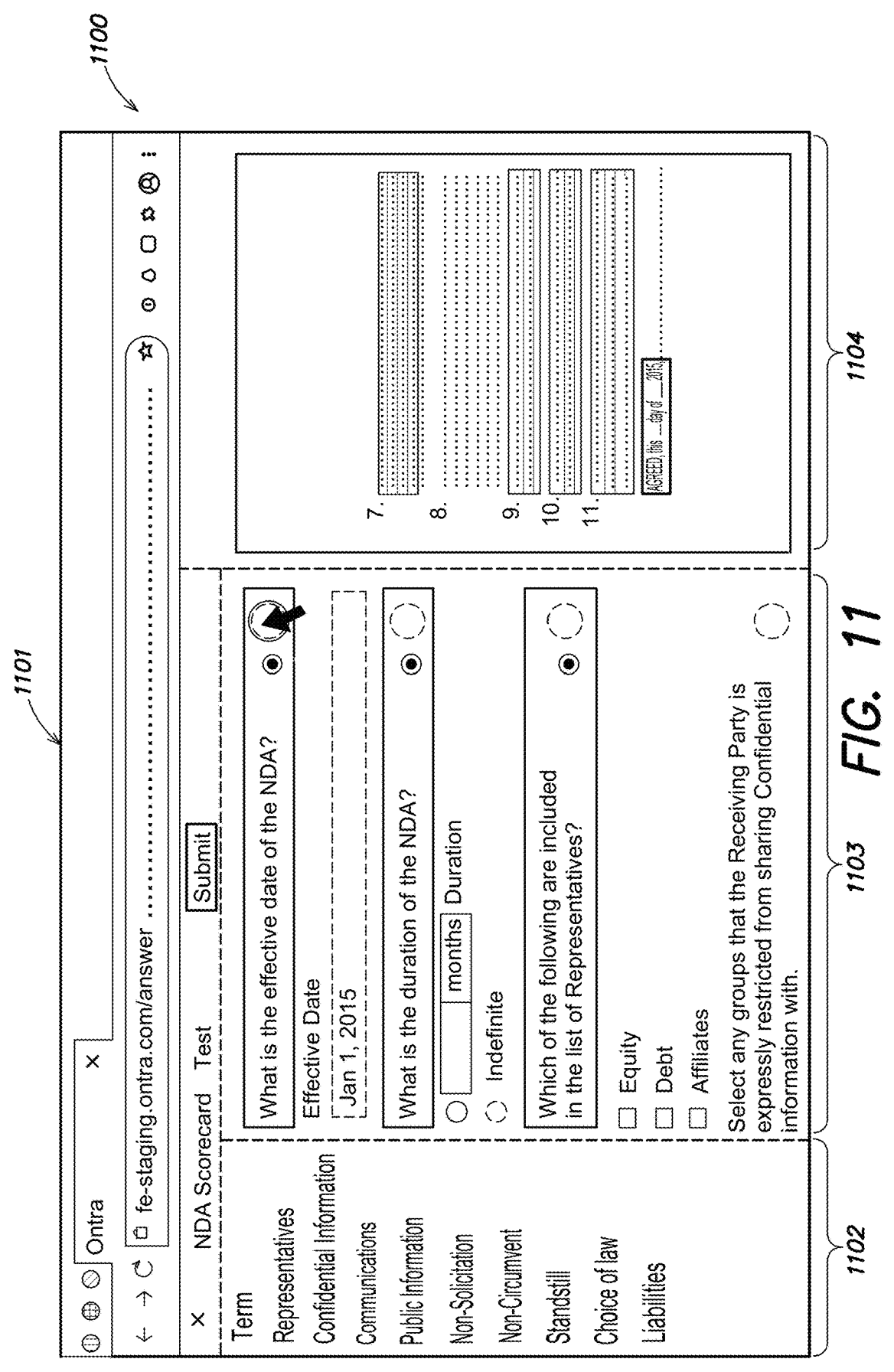
Figure 12:
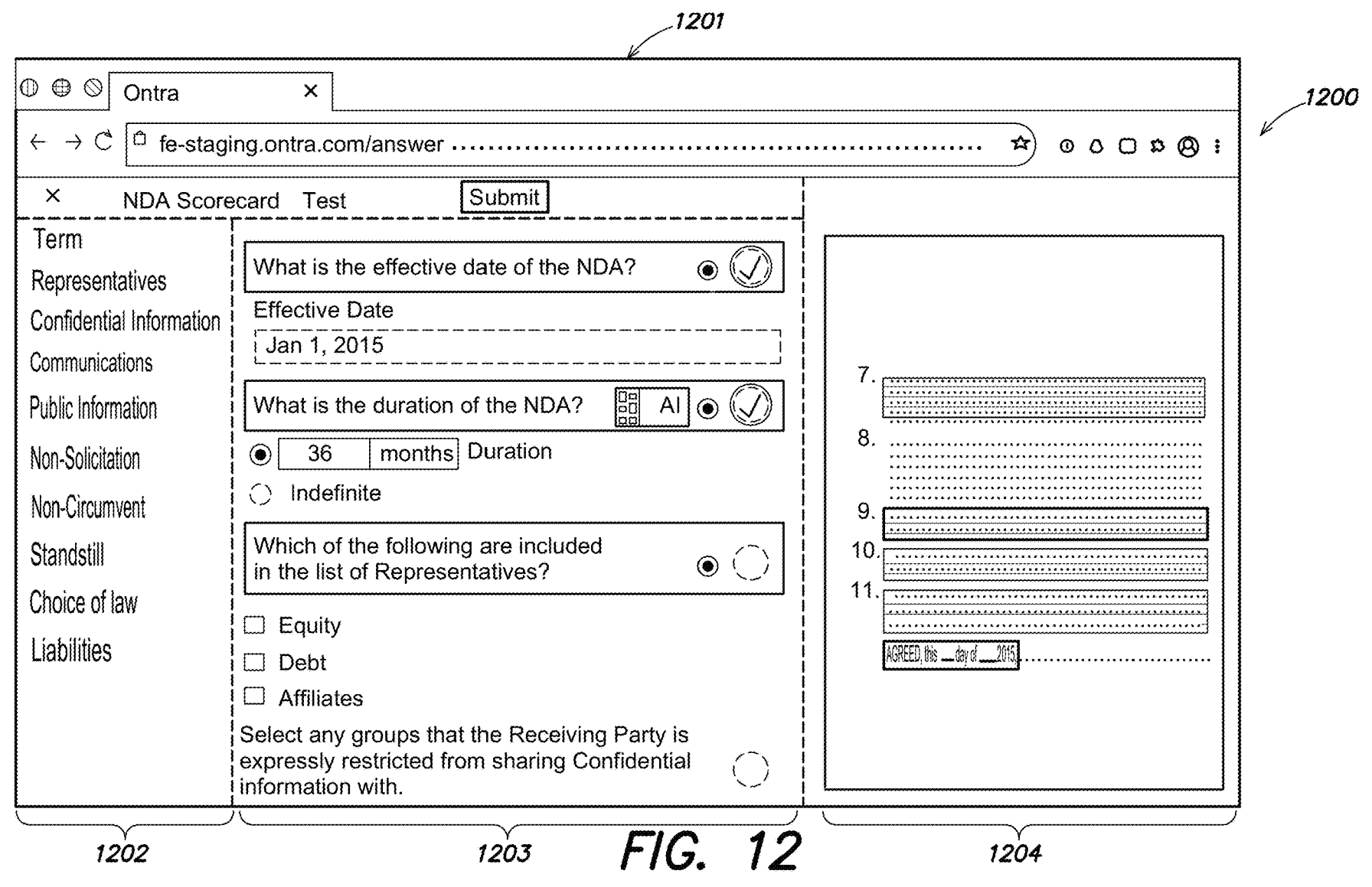

In some embodiments, by tapping another input (e.g., tapping a crosshair) in the interface (e.g., as shown by way of example in FIG. 11 which shows similar sections (e.g., term hierarchy area 1102 on the left, questions area 1103 in the middle and the document view area 1104 on the right)), the system causes the document view to to jump to the pertinent text (e.g., AGREED, this _____ day of _____ 2015). This may be indicated visually such as by highlighting or other interface action. In FIG. 12, the user may be permitted to select a control (e.g., tap a checkbox) to accept the machine learning prediction. FIG. 12 shows similar sections (e.g., term hierarchy area 1202 on the left, questions area 1203 in the middle and the document view area 1204 on the right). There may also be provided an additional indicator that visually shows to the user when an AI prediction was accepted by the user (e.g., with a box containing AI). Further, the interface may permit a user to enter a manual input that disagrees with the machine-learning prediction. In some embodiments, agreement and disagreement information that are provided by the user are ingested back into the machine learning system to further improve prediction quality by retraining the model.

Figure 13:
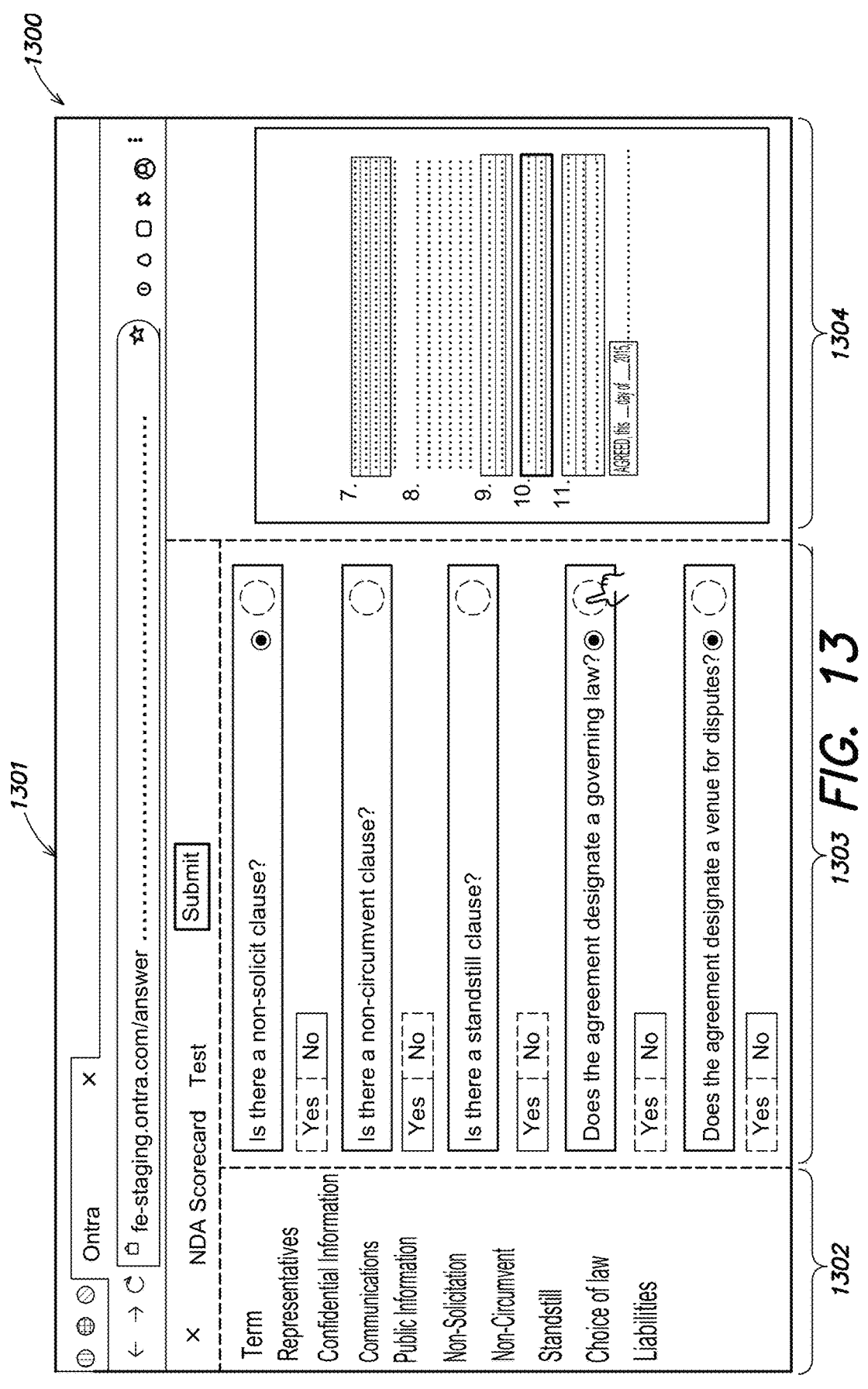

In some embodiments, some questions may have different parts of the hierarchy exposed based on answers. For example, in FIG. 13, there may be an anatomy structure and associated information that relates to governing law. FIG. 13 shows similar sections (e.g., term hierarchy area 1302 on the left, questions area 1303 in the middle and the document view area 1304 on the right). In some embodiments, the interface automatically adapts to user inputs and prepares prompting to the user depending on the input. For example, selecting 'yes' in the interface under the "governing law" question exposes another question on the term hierarchy asking for the specific State (e.g., also with a prediction in this example).

In some other aspects, a ML/AI component may be capable of providing the user predictions responsive to training based on previous user inputs. The ML/AI component may provide predictions in near-real time as the user is interacting within the interface. In some implementations, the AI component highlights the related text (shown as a 'target' on a question) within the interface. Further, the user interface may be programmed to show an indicator (e.g., dotted lines) that indicate an AI suggestion, and the user is permitted to 1-click 'accept'. In some implementations, in 'AI' icon if the answer does not match the AI suggestion, the system ingests the answer into the human-in-the-loop feedback system and retrains in near-real time.

Example Computer Implementations

Figure 14:
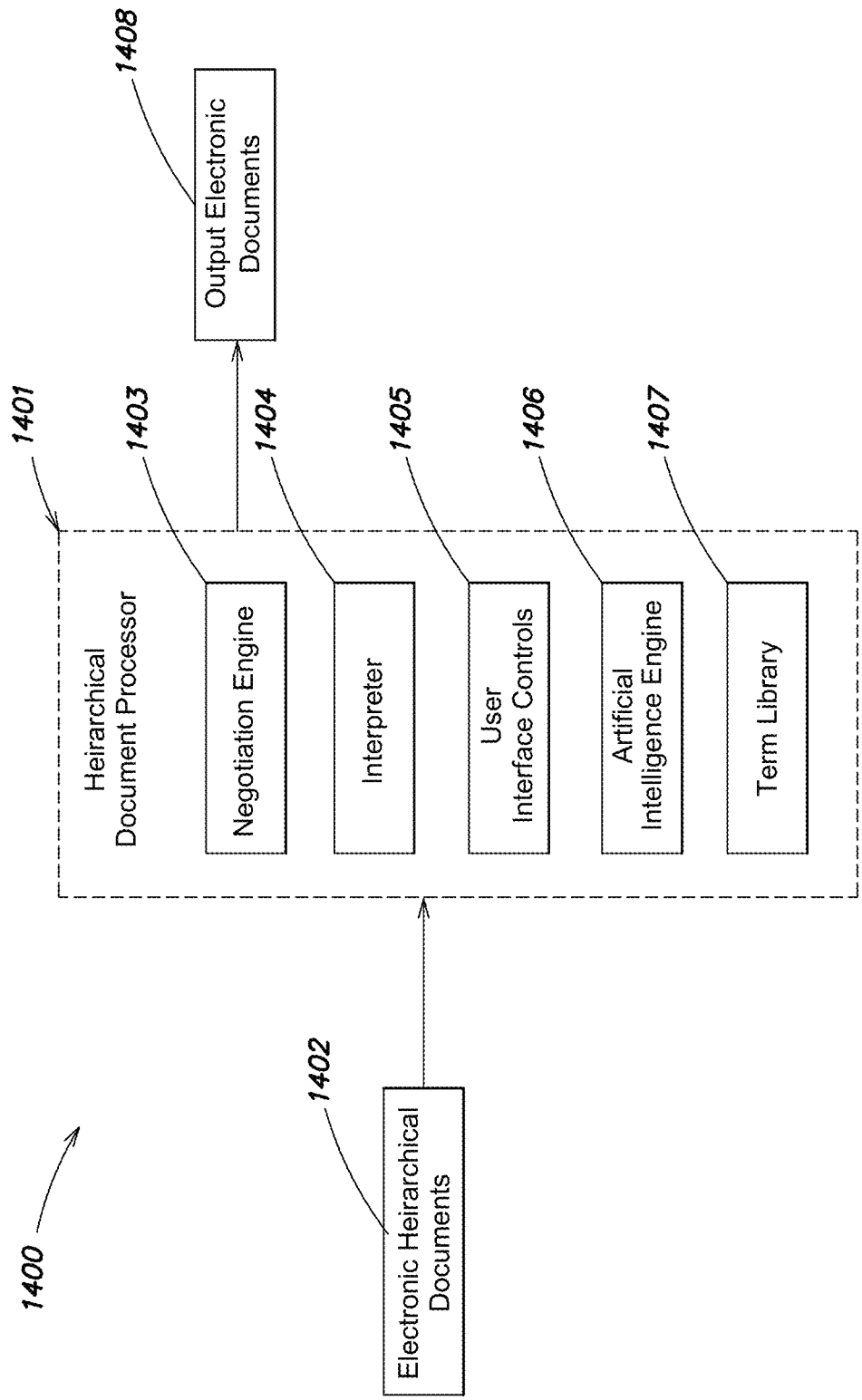
FIG. 14 shows an example distributed system capable of processing electronic documents according to various embodiments.

As shown in FIG. 14, the system may be implemented by one or more components executing on a computer system (e.g., having a processor, memory and storage). In the example in FIG. 14, a distributed system 1400 may be provided that is capable of processing electronic documents. In some cases, the system may be configured to create electronic hierarchical documents (e.g., documents 1402). Such documents may be created using an anatomy structure as discussed above. Some documents may be mixtures of structured and unstructured information.

In some embodiments, a hierarchical document processor 1401 may be provided that is able to create, modify, and manage hierarchical documents 1402. Processor 1401 may be configured to interpret hierarchical documents and be configured to create output electronic documents (e.g., documents 1408) which may correspond to natural language documents that can be read and understood by humans.

Hierarchical document processor 1401 may include a number of components. In particular, processor 1401 may include a negotiation engine that may be used to automatically negotiate an electronic document based on one or more playbooks. Processor 1401 may also include an interpreter 1404 which is configured to interpret one or more sections of hierarchical documents and perform one or more interface and/or control functions based on the interpreted formats. Processor 1401 may also include one or more user interface controls 1405 that are used to present user interface functions to a user. In some example implementations, processor 1401 may include one or more artificial intelligence engines 1406 to perform one or more functions (e.g., interface interpretation and prediction). Also, processor 1401 may have an associated term library 1407 including terms that correspond to codes residing in the hierarchical document structure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments. The computer-readable storage medium can be transportable such that the program stored thereon can be loaded onto any computer resource to implement the aspects discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects.

Example Special-Purpose Computer System

A special-purpose computer system can be specially configured as disclosed herein. According to one embodiment the special-purpose computer system is configured to perform any of the described operations and/or algorithms (e.g., database operations). The operations and/or algorithms described herein can also be encoded as software executing on hardware that defines a processing component, that can define portions of a special purpose computer, reside on an individual special-purpose computer, and/or reside on multiple special-purpose computers.

Figure 15:
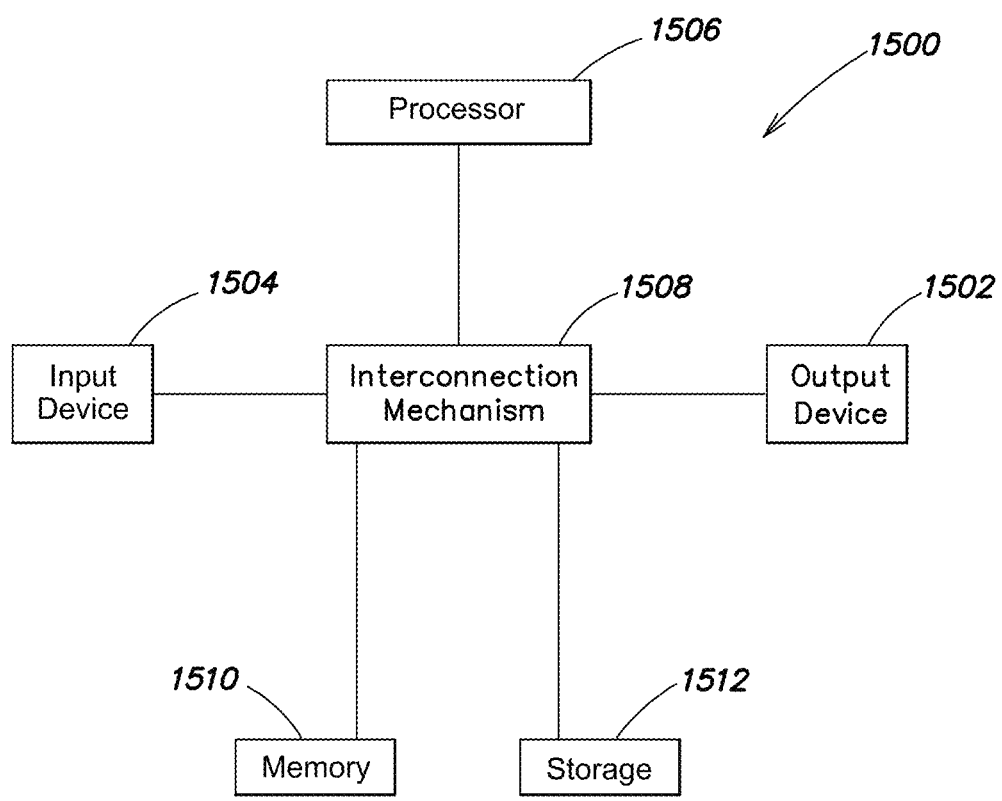
FIG. 15 is a block diagram of an example special-purpose computer system according to some embodiments.

FIG. 15 shows a block diagram of an example special-purpose computer system 1500 on which various aspects of the present invention can be practiced. For example, computer system 1500 may include a processor 1506 connected to one or more memory devices 1510, such as a disk drive, memory, or other device for storing data. Memory 1510 is typically used for storing programs and data during operation of the computer system 1500. Components of computer system 1500 can be coupled by an interconnection mechanism 1508, which may include one or more busses (e.g., between components that are integrated within a same machine) and/or a network (e.g., between components that reside on separate discrete machines). The interconnection mechanism enables communications (e.g., data, instructions) to be exchanged between system components of system 1500.

Computer system 1500 may also include one or more input/output (I/O) devices 1502-1504, for example, a keyboard, mouse, trackball, microphone, touch screen, a printing device, display screen, speaker, etc. Storage 1512 typically includes a computer readable and writeable nonvolatile recording medium in which computer executable instructions are stored that define a program to be executed by the processor or information stored on or in the medium to be processed by the program.

Figure 16:
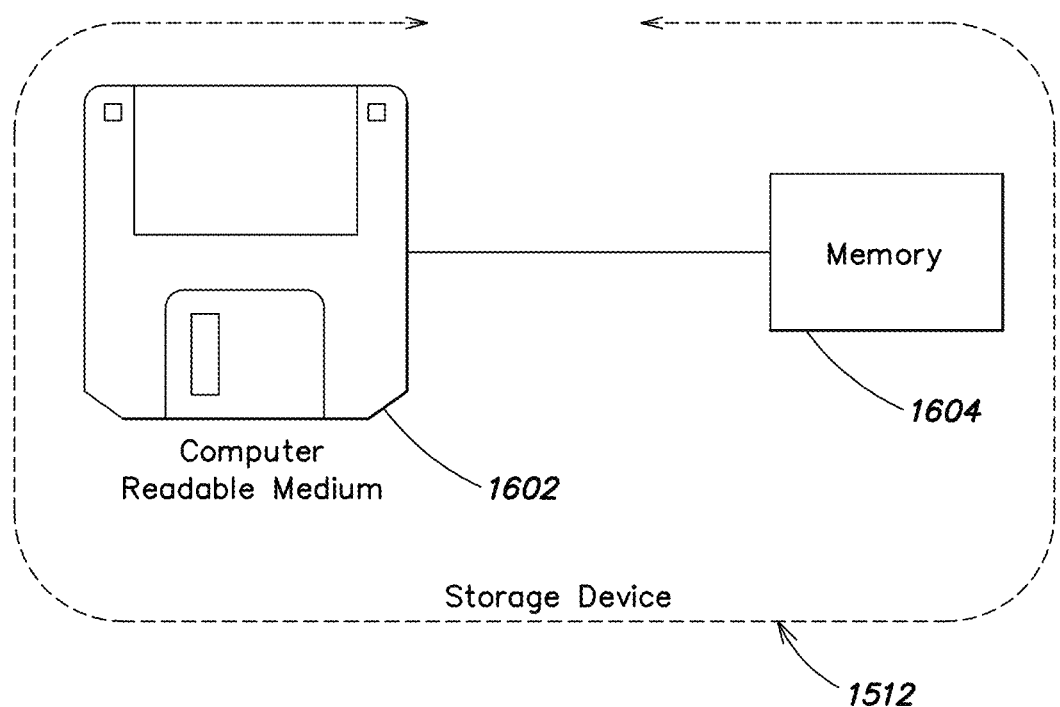
FIG. 16 is a block diagram of an example disk or flash memory according to some embodiments.

The medium can, for example, be a disk 1602 or flash memory as shown in FIG. 16. Typically, in operation, the processor causes data to be read from the nonvolatile recording medium into another memory 1604 that allows for faster access to the information by the processor than does the medium. This memory is typically a volatile, random access memory such as a dynamic random-access memory (DRAM) or static memory (SRAM). According to one embodiment, the computer-readable medium comprises a non-transient storage medium on which computer executable instructions are retained.

Referring again to FIG. 15, the memory can be located in storage 1512 as shown, or in memory system 1510. The processor 1506 generally manipulates the data within the memory 1510, and then copies the data to the medium associated with storage 1512 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention can be implemented in software, hardware or firmware, or any combination thereof. Although computer system 1500 is shown by way of example, as one type of computer system upon which various aspects of the invention can be practiced, it should be appreciated that aspects of the invention are not limited to being implemented on the computer system as shown in FIG. 15. Various aspects of the invention can be practiced on one or more computers having a different architectures or components than that shown in FIG. 15.

It should be appreciated that the invention is not limited to executing on any particular system or group of systems. Also, it should be appreciated that the invention is not limited to any particular distributed architecture, network, or communication protocol.

Various embodiments of the invention can be programmed using an object-oriented programming language, such as Java, C++, or C# (C-Sharp). Other programming languages may also be used. Alternatively, functional, scripting, and/or logical programming languages can be used. Various aspects of the invention can be implemented in a non-programmed environment (e.g., documents created in HTML, XML or other format that, when viewed in a window of a browser program, render aspects of a graphical-user interface (GUI) or perform other functions). The system libraries of the programming languages are incorporated herein by reference. Various aspects of the invention can be implemented as programmed or non-programmed elements, or any combination thereof.

A distributed system according to various aspects may include one or more specially configured special-purpose computer systems distributed among a network such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

Conclusion

Having thus described several aspects and embodiments of this invention, it is to be appreciated that various alterations, modifications and improvements will readily occur to those skilled in the art. Such alterations, modifications, and improvements are intended to be part of this disclosure and are intended to be within the spirit and scope of the invention. Accordingly, the foregoing description is by way of example only.

Various aspects may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computer system comprising:
a processor;
a memory;
computer instructions, when executed, cause the computer system to provide a system for managing digital documents, the system for managing digital documents being programmed to:
define a data model defining a plurality of terms wherein the plurality of terms comprise one or more first terms in a first language and one or more second terms in a second language different than the first language;
generate a mapping between the one or more first terms in the first language and the one or more second terms in the second language having a similar meaning;
create at least one document, including the plurality of terms;
permit a user to selectively choose terms from the plurality of terms to form the at least one document, and wherein the system further comprises a machine learning element that is adapted to suggest at least one term among the plurality of terms for inclusion in the at least one document;
create an anatomy of the at least one document and one or more questions derived from the anatomy;
generate a first display for a graphical user interface comprising the anatomy and the one or more questions derived from the anatomy;
receive one or more responses corresponding to the one or more questions displayed on the graphical user interface;
generate a second display for the graphical user interface comprising the anatomy and a range of acceptable values for at least one of the terms selectively chosen by the user;
determine a value for the at least one term selectively chosen by the user within the range of acceptable values; and
generate a display for the graphical user interface comprising a natural language version of the document derived from the anatomy, the value for the at least one term selectively chosen by the user, and the one or more responses.

2. The system according to claim 1, wherein the plurality of terms includes a hierarchy that relates the plurality of terms.

3. The system according to claim 2, wherein the system is configured to compare at least two of the hierarchy of terms based on a relative strength between the at least two terms.

4. The system according to claim 1, wherein the system is configured to auto-negotiate terms of the at least one document between at least two entities.

5. The system according to claim 4, wherein the system is adapted to define, for each of the at least two entities, a playbook that identifies parameters by which the at least one document should be negotiated by the system.

6. The system according to claim 2, wherein the system further comprises a machine learning element that is adapted to suggest at least one term among the hierarchy of terms for inclusion in the at least one document.

7. The system according to claim 6, wherein the machine learning element is configured to train responsive to user input provided to the system.

8. The system according to claim 7, wherein the machine learning element is configured to train and adapt responsively to user input provided to the system in a feedback loop.

9. A method comprising acts of:
defining a data model defining a hierarchy of terms associated with electronic documents wherein the terms comprise one or more first terms in a first language and one or more second terms in a second language different than the first language;
generate a mapping between the one or more first terms in the first language and the one or more second terms in the second language having a similar meaning;
creating at least one electronic document, including the hierarchy of terms; and
permitting, within a computer interface of a computer system, selectively choose terms from the plurality of terms to form the at least one electronic document, and wherein the system further comprises a machine learning element that is adapted to suggest at least one term among the plurality of terms for inclusion in the at least one electronic document;
creating an anatomy of the at least one electronic document and one or more questions derived from the anatomy;
generating a first display for a graphical user interface comprising the anatomy and the one or more questions derived from the anatomy;
receiving one or more responses corresponding to the one or more questions displayed on the graphical user interface;
generating a second display for the graphical user interface comprising the anatomy and a range of acceptable values for at least one of the terms selectively chosen by the user;
determining a value for the at least one term selectively chosen by the user within the range of acceptable values; and
generating a display for the graphical user interface comprising a natural language version of the electronic document derived from the anatomy, the value for the at least one term selectively chosen by the user, and the one or more responses.

10. The method according to claim 9, wherein the plurality of terms includes a hierarchy that relates the plurality of terms.

11. The method according to claim 9, further comprising an act of comparing, by the computer system, at least two of the hierarchy of terms based on a relative strength between the at least two terms.

12. The method according to claim 9, further comprising an act of auto-negotiating, by a computer system, terms of the at least one electronic document between at least two entities.

13. The method according to claim 12, further comprising an act of defining, for each of the at least two entities, a playbook that identifies parameters by which the at least one electronic document should be negotiated by the computer system.

14. The method according to claim 9, further comprising an act of suggesting, by a machine learning element, at least one term among the hierarchy of terms for inclusion in the at least one electronic document.

15. The method according to claim 14, further comprising an act of training the machine learning element responsive to user input provided to the system.

16. The method according to claim 15, further comprising an act of training the machine learning element responsively to user input provided to the system in a feedback loop.

17. A non-transitory computer-readable medium, that when executed by at least one processor, performs a method comprising acts of:
  defining a data model defining a hierarchy of terms associated with electronic documents wherein the terms comprise one or more first terms in a first language and one or more second terms in a second language different than the first language;
  generate a mapping between the one or more first terms in the first language and the one or more second terms in the second language having a similar meaning;
  creating at least one electronic document, including the hierarchy of terms; and
  permitting, within a computer interface of a computer system, selectively choose terms from the plurality of terms to form the at least one electronic document, and wherein the system further comprises a machine learning element that is adapted to suggest at least one term among the plurality of terms for inclusion in the at least one electronic document;
  creating an anatomy of the at least one electronic document and one or more questions derived from the anatomy;
  generating a first display for a graphical user interface comprising the anatomy and the one or more questions derived from the anatomy;
  receiving one or more responses corresponding to the one or more questions displayed on the graphical user interface;
  generating a second display for the graphical user interface comprising the anatomy and a range of acceptable values for at least one of the terms selectively chosen by the user;
  determining a value for the at least one term selectively chosen by the user within the range of acceptable values; and
  generating a display for the graphical user interface comprising a natural language version of the electronic document derived from the anatomy, the value for the at least one term selectively chosen by the user, and the one or more responses.

* * * * *